Figure 1:
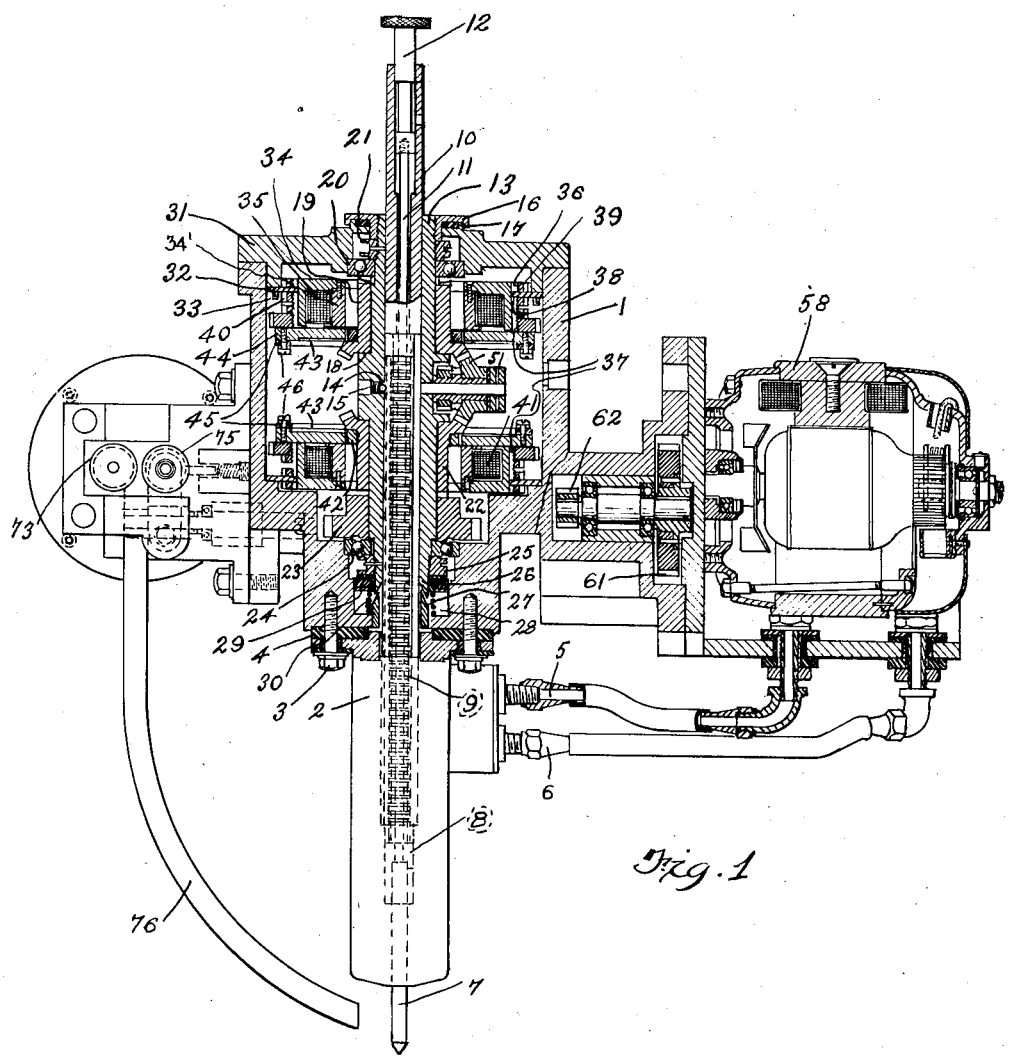

Jan. 12, 1932.  S. C. OSBORNE  1,840,735
WELDING MECHANISM
Filed Nov. 15, 1930  3 Sheets-Sheet 1

INVENTOR.
Samuel C. Osborne
BY
Fay Oberlin & Fay
ATTORNEYS

Jan. 12, 1932.  S. C. OSBORNE  1,840,735

WELDING MECHANISM

Filed Nov. 15, 1930   3 Sheets-Sheet 2

INVENTOR.
Samuel C. Osborne
BY
Fay Oberlin & Fay
ATTORNEYS.

Jan. 12, 1932.  S. C. OSBORNE  1,840,735
WELDING MECHANISM
Filed Nov. 15, 1930   3 Sheets-Sheet 3

INVENTOR.
Samuel C. Osborne
BY
Ray Oberlin & Ray
ATTORNEY.

Patented Jan. 12, 1932

1,840,735

UNITED STATES PATENT OFFICE

SAMUEL C. OSBORNE, OF CLEVELAND HEIGHTS, OHIO, ASSIGNOR TO THE LINCOLN ELECTRIC COMPANY, OF CLEVELAND, OHIO, A CORPORATION OF OHIO

WELDING MECHANISM

Application filed November 15, 1930. Serial No. 495,874.

This invention, relating as indicated to arc welding mechanism, has specific reference to a mechanism for supportng the welding electrode in such a manner as to generally increase the efficiency of the welding mechanism.

In machines adapted for carbon arc welding the carbon pencil is usually supported by an electrode holder which is supported by what is commonly termed a welding head. This invention has to do primarily with the construction of such welding head and its associated actuating and control mechanism whereby the electrode is properly supported with respect to the work to be welded.

In order that the carbon welding electrode direct the arc in a specific direction onto the work to be welded, it is necessary that such electrode be relatively small in diameter since if a large electrode were used the arc would have a tendency to play over the face of the electrode and would therefore not be suitable with respect to the relatively narrow seam along which it is required to traverse. In order to employ a carbon electrode of relatively small diameter some means must be provided for leading the current away from such electrode very close to the work, inasmuch as the relatively high current used in welding would soon cause a depreciation of the exposed portion of the electrode and seriously curtail its efficiency. Cooling means must also be provided for the means leading the current away from the electrode due to its position so close to the arc so that a destruction of such contact means will not result from the high heat, and further so that the feed of the electrode will not be interfered with. The electrode as it traverses the seam must also be rotated in order to insure a uniform burning off of the tip thereof, since if the electrode were not rotated the tip would have a tendency to burn off at a slant, which would eventually result in a splintering of the electrode which would disturb the arc. I propose to employ a contact which is a part of the cooling means by which the electrode is supported, so that as the electrode rotates, the contact between the copper forming a part of the cooling jacket and the electrode will be kept clean at all times and obviate any possibility of binding.

As the electrode is moved along the seam, due to irregularities in the material to be welded, as well as the burning off of the tip of the carbon, it becomes necessary to provide a means which is responsive to a characteristic of the welding arc for maintaining the length of the same constant at all periods of the welding process. It is an object of my invention to provide a means whereby the arc is maintained at a constant length by feeding the electrode to, or retracting it from, the work in response to variations in the characteristics of the welding circuit, such movement of the electrode being carried on at a continuously variable and constantly adjustable rate.

Any adjusting means for the electrode which shall operate with a reasonable degree of efficiency must be made responsive to variations in an arc characteristic and must be capable of making the proper adjustment without effecting a disturbance of the arc length in a direction opposite to that which has just been corrected. For the purpose of controlling the arc length I propose to employ a system of epicyclic gearing which is actuated by electro magnetic brakes which are controlled by a very sensitive relay.

The sensitivity of the relay is obtained by the use of oppositely disposed solenoids which buck each other so that the common armature responds to the minute difference between the two solenoids. Relays as now commonly employed with electric welding mechanism obtain the adjustment by having a solenoid which is responsive to the characteristic of the welding circuit bucking a spring which is adjustable according to the arc length required. This construction has the decided disadvantage in that any such spring is not readily adjusted, and also the current in the solenoid which is responsive to the characteristics of the welding circuit has a tendency to heat this coil and, as the welding process continues, cause a maladjustment of the arc length from that at which it was originally set. By the employment of oppositely disposed coils, one of which carries a constant current, which is variable at the will of the operator to control the proper length of the arc, and also the two coils being practically identical, internal heating of such coils, when it does occur will be automatically compensated, and therefore the arc length to which the mechanism was originally adjusted is not disturbed.

The use of a relay in the manner described has heretofore been the source of considerable annoyance due to the hunting action of such relay as the adjustment of the arc length is sought to be effected thereby. If the relay is permitted to close the circuit which moves the electrode for a considerable period of time in the course of the adjustment it usually results in the electrode over-traveling the point to which it is sought to be adjusted. In order to entirely obviate this hunting of the relay I propose to employ an auxiliary coil on the solenoid of the relay, which coil will when energized, produce a force on the armature which is opposite to the force exerted thereon by the stronger of the two coils. This arrangement results in the armature of the relay closing the contact in the control circuit for relatively short periods of time so that the electrode is gradually fed up to the point at which it is desired to be maintained without any tendency to cause an over feeding.

The employment of epicyclic gearing which is actuated by electro-magnetic brakes has decided advantages in that the brakes are in contact with the oppositely disposed gears at all times, and when the control circuit is closed an increase in the pressure between one of the brakes and its associate gear will cause a slipping or slowing down of such gear in a very gradual manner so that the electrode is slowly and smoothly fed to effect the proper adjustment. The electro-magnetic brakes, being in communication with the very sensitive relay above described, are operable at all times to instantaneously feed the electrode in the proper direction and prevent the possibility of injury to the mechanism should any part thereof become jammed, in that such jamming will simply cause a slipping between the brake and its gear without any injury to the mechanism.

The employment of the welding head which supports the electrode and its associated mechanism should also be provided with means whereby, when the circuit is closed, the welding electrode is automatically fed downwardly to contact with the work to be welded and retracted therefrom in order to strike the welding arc. Considerable difficulty has been experienced in mechanically feeding the electrode to the work and retracting it therefrom due to the frailty of the carbon electrode, which, upon any appreciable pressure, will splinter or otherwise break.

The mechanism which I propose to employ, being connected to the highly sensitive relay, will automatically reverse the direction of travel of the electrode as soon as an arc is set up between the electrode and the work.

When the welding process is initiated, that is, when the arc is struck and the carriage which supports the head begins to traverse the seam, all mechanisms of this character produce an inferior weld at the point at which the weld is commenced. Sufficient time should be permitted to elapse between the striking of the arc and the moving of the carriage so that the metal at the beginning of the weld shall have time to become fused and the arc stabilized before the traversing motion begins.

It is among the objects of my invention to provide a welding mechanism which shall have all of the above desirable advantages and which shall be relatively simple in construction and easy to maintain. Other objects of my invention will appear as the description proceeds.

To the accomplishment of the foregoing and related ends said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figure 2:
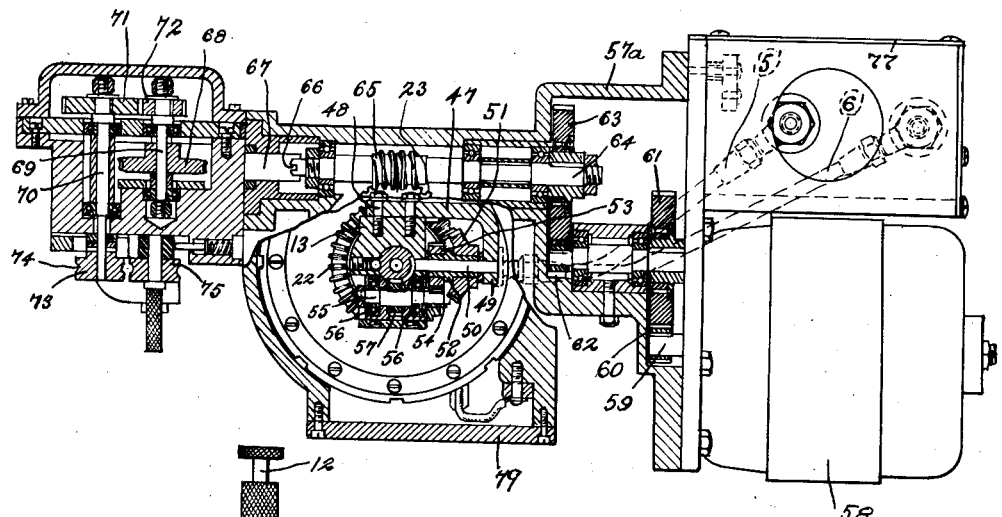
Figure 3:
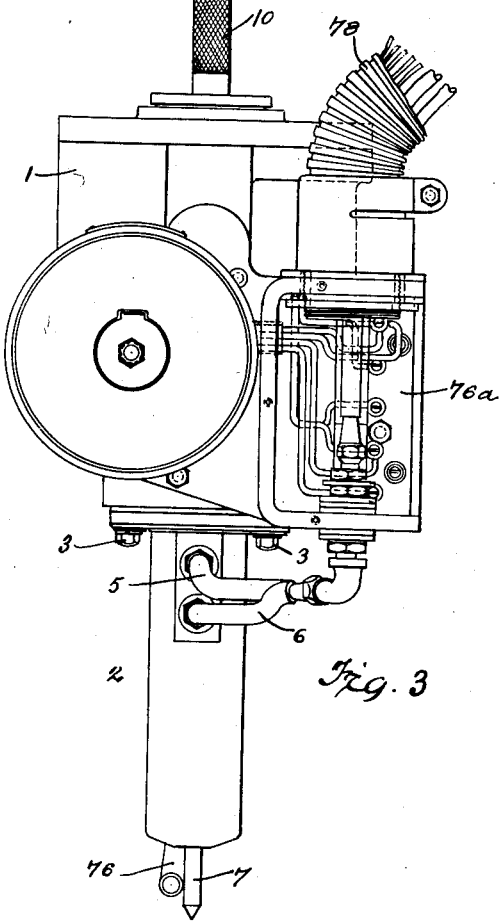
Figure 4:
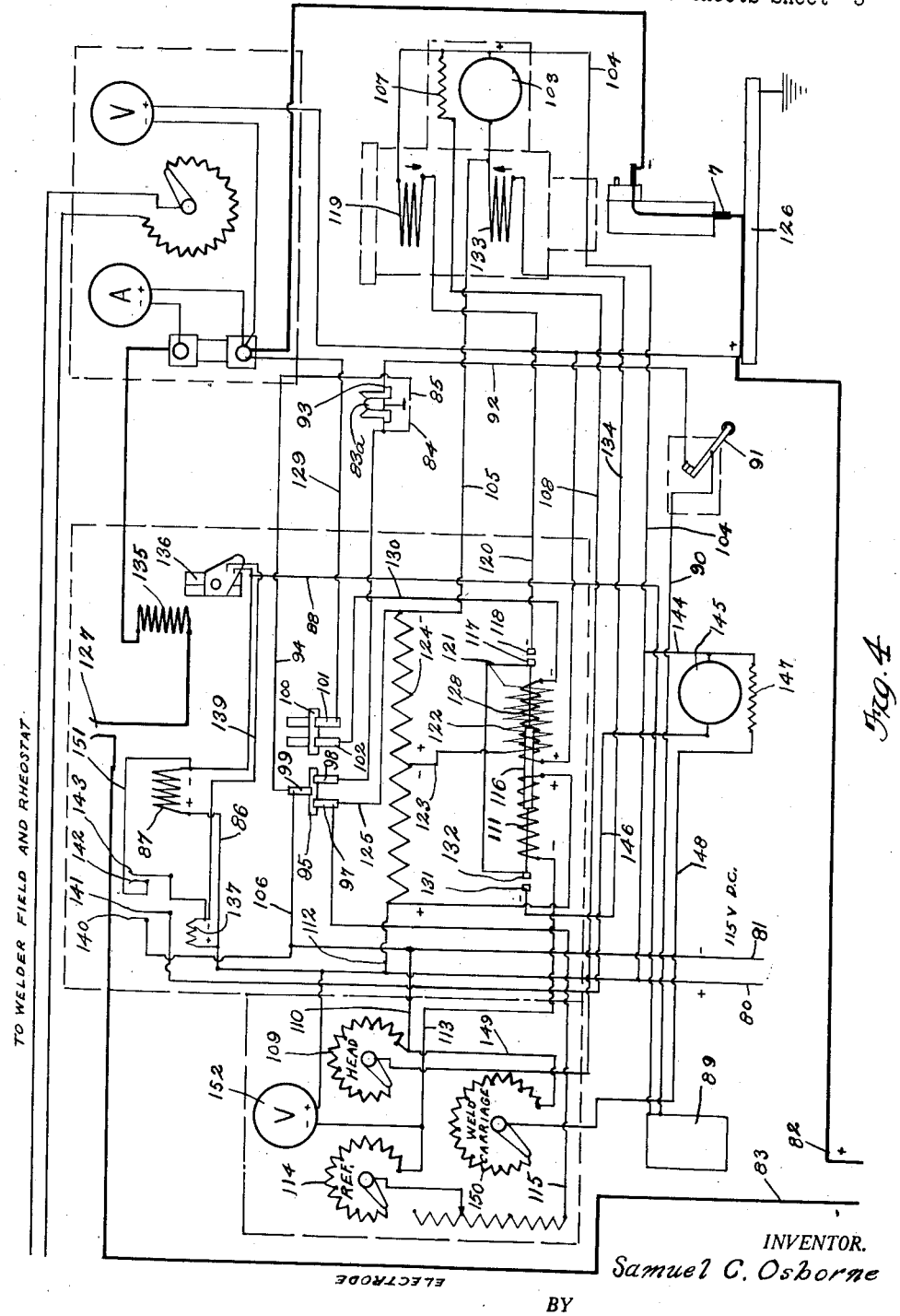

In said annexed drawings:

Figure 1 is a part section, part elevation of the welding head comprising my invention; Fig. 2 is a transverse part section part plan view of the head illustrated in Fig. 1; Fig. 3 is a fragmentary side elevation of the welding head; and Fig. 4 is a schematic wiring diagram of the electrical connection employed in connection with the welding head.

Referring more specifically to the drawings, and more especially to Fig. 1, the welding head here illustrated has a main body frame 1 which has removably secured thereto at its lower end a tubular member 2 by means of the bolts 3. The tubular member 2 is more specifically described in co-pending application Serial No. 249,267, filed January 25, 1928, and will for purpose of convenience be hereinafter referred to as the electronic tornado. The electronic tornado 2 is insulated from the body 1 by means of the insulating material 4 and has interconnecting therewith the conduits 5 and 6 which serve as a means for supplying cooling fluid to the tornado 2. It will be noted in connection with the conduits 5 and 6 that the welding current which is supplied to the electrode 7 is carried through conduits 6 which contacts with the electrode 7 in the interior of the tornado 2.

The electrode 7 is frictionally secured by the terminal portion 8 of the electrode holder 9 which passes axially through the body 1 of the welding head and has a portion 10 extending upwardly therethrough. The electrode holder 9 is centrally provided with a plunger 11 which may be actuated by the pin 12 to eject the electrode 7 from the holder 9. The electrode holder 9 is encompassed by a suitable tubular member 13 which has a ball 14 secured therein by means of the screw plug 15. The ball 14 engages a longitudinal groove in the electrode holder 9 so that upon rotation of the tubular member 13 the electrode holder 9 will rotate therewith.

The tubular member 13 has removably secured thereto a cap 16 which secures the packing ring 17. The packing ring 17 prevents dust and dirt from entering the body of the welding head at the upper central portion thereof. The tubular member 13 has a circumferential shoulder 18 formed thereon which serves as an abutment for the gear 19 which is mounted coaxially with the member 13. Encompassing the tubular member 13 is a bearing 20 which is secured thereto by means of the locking ring 21. The tubular member 13 has another gear 22 mounted thereon, which gear is similar to gear 19, but which is oppositely disposed thereto. A worm gear 23 is rigidly secured to the tubular member 13 and the lower portion of the tubular member 13 is revolubly supported by means of the bearing 24 which is locked thereto by means of the lock ring 25. The lower terminal portion 26 of the member 13 is in the form of a cone which is in overlying relation to a similarly formed member 27 so that any lubricant which follows down along the side of the electrode holder 9 will flow into the chamber 28 and not pass downwardly into the tornado 2 and interfere with the operation of the welding device. A packing ring 29 seals the lower end of the chamber within the welding head where the tubular member 13 passes downwardly therethrough, which ring is maintained in place by means of the spring 30.

The cover 31 of the body 1 of the welding head, which is removably secured thereto has an annular member 32 secured thereto by means of the bolts 33. Coaxially positioned with the annular member 32 is an annular ring 34, which has removably secured thereto a ring 34' which forms a recess for the coil 35. The annular ring 34 has its periphery threaded as at 36 and has spaced axially extending grooves 37 formed therein. The grooves 37 receive the projections 38 formed integrally with the inner member 32 so that the member 33 is revolubly restrained with respect to the member 32, but axially adjustable therewith. The threaded surface of the member 34 has lock rings 39 and 40 secured thereto which serve as a means whereby the member 34 and its associated coil is suspended through the annular member 32 from the removable cover 31.

The construction of the lower coil 41 and its associated parts is identical with the construction just outlined for the upper coil so that no further description of this lower coil construction is deemed necessary.

The hubs of the gears 19 and 22 are threaded to receive a lock ring 42 which secures to these gears diaphragms 43, which are indicated by a single line in Fig. 1. The diaphragms 43 have secured thereto disk-like members 44 by means of circumferential rings 45, which disks 44 and rings 45 are united by circumferentially spaced bolts 46.

As most clearly shown in Figs. 1 and 2 the tubular member 13 has a bracket 47 secured thereto by means of bolts 48, which bracket has a laterally extending portion 49. Terminally mounted in the tubular member 13 and the laterally extending member 49 of the bracket 47 is a shaft 50 which revolubly supports a gear 51. The gear 51 is in mesh with both gears 19 and 22 which are loosely mounted on the tubular member 13. The bushing 52, which is rigidly secured to the gear 51 has terminally mounted thereon a gear 53 which meshes with a pinion 54 rigidly secured to the shaft 55. The shaft 55 is terminally revolubly supported by bearing 56 and has rigidly secured thereto a pinion 57. The pinion 57 meshes with the toothed face of the electrode holder 9 so that upon rotation of the gear 51 the electrode holder may be moved axially in either direction.

The main body 1 of the head has a gear housing 57a extending laterally therefrom, which housing is adapted to support a motor 58. The shaft 59 of the motor 58 has a pinion 60 keyed thereto which, through the gears 61, 62 and 63 may be caused to drive the shaft 64. The shaft 64 has rigidly secured thereto a worm 65 which meshes with worm gear 23 to rotate the tubular member 13.

The shaft 64 has a slot 66 formed in one end thereof, which slot engages the complementary end of the shaft 67 to provide a flexible driving connection between the shaft 64 and the shaft 67. The shaft 67 is in driving communication, through a worm (not shown) with the gear 68 which is rigidly secured to the shaft 69. The shaft 69 is in driving communication with the shaft 70 through the reversible gears 71 and 72. The shaft 70 has terminally mounted thereon a roller 73 which has a circumferential groove 74 formed therein and which, with the similarly formed revoluble roller 75, provides a means for feeding a combustible material through the tube 76 to the area of the arc.

The body 1 of the welding head is provided with a box-like aperture 76a, which is normally closed by the removable cover plate 77. The aperture 76 provides a means for ready access to the various leads in connection with the welding head, which leads are all contained within the flexible conduit 78 and are thereby protected from damage during the operation of the device. The removable cover 79 gives access to the working parts in body 1.

The operation of the welding head will be more clearly understood with reference to the wiring diagram as illustrated by Fig. 4, and therefore the operation of the device will be explained with reference to this figure.

The leads 80 and 81 are respectively the positive and negative sides of a direct current line which is utilized to operate the control mechanism. The leads 82 and 83 are respectively the positive and negative sides of the welding current circuit which, in order to more clearly distinguish it from the control circuit, has been drawn in slightly heavier lines. For purposes of this description it will be presumed that the welding head is carried by a motor-driven carriage adapted to travel the length of the seam to be welded. When the welding operation is to be started the operator will press the push button 83a which will close the contact between the leads 84 and 85. When the leads 84 and 85 are so connected current will flow from lead 80 through lead 86, energizing the solenoid 87 and passing to the negative lead 81 through the lead 88, the water switch 89, the lead 90, the limit switch 91, the lead 92 and the contact 93 in the push button switch, and then through the leads 84 and 85 to lead 81. Energization of the solenoid 87 will move the interlocking bar 95 into contact with the contact fingers 97, 98 and 99 and will likewise bring the inter-locking bar 100 into contact with the contact fingers 101 and 102. By connecting the contact finger 98 with the contact finger 99 a circuit is established which will maintain the solenoid 87 energized after the push button 83 has been released. By connecting the contact fingers 97 and 99, the armature 103 of the motor in the welding head, which has heretofore been designated by the ordinal 58, is connected across the lines 80 and 81 through the leads 104, 105 and 106. The current to the motor field 107 passes from lead 104 through the field winding 107, then through the lead 108, through the rheostat 109 which is connected to the negative lead 81 by means of the lead 110. When the windings for the head motor 58 are energized in the manner just explained, the coil 111 will also be energized by current passing from positive lead 80 through the lead 112, the coil 111, the lead 113, the rheostat 114, lead 115, and through the contact fingers 97 and 99 to the negative lead 81. Upon energization of the coil 87 in the manner hereinbefore described the switch 127, which closes the welding circuit, will be actuated, permitting current to flow through leads 129 and 130, energizing coil 128 which, at its other end, is connected to the opposite side of the welding circuit. Energization of the coil 128 will move the armature 116 to the right, closing the contacts 117 and 118. By closing the contacts 117 and 118 current is permitted to pass from the lead 104, through the solenoid coil 119, through the lead 120, into the lead 121. From the lead 121 the current passes through the coil 122 to the negative lead 81, through the lead 123, the resistor 124, the lead 125 and the contact fingers 97 and 99.

The energization of the coil 119, which has heretofore been designated as the upper coil 35 in the welding head, will produce an electro-magnetic force sufficient to cause frictional engagement between the coil housing and the disk-like member 44 so as to arrest the rotation of the gear 19. When the gear 19 is so arrested the continuous rotation of the member 13 by the motor 58 will cause a rotation of the gear 51 so as to feed the electrode 7 downwardly to contact with the work 126. As soon as the electrode contacts with the work a short circuit is set up which decreases the current flowing in the coil 128 so that now the coil 111, being the stronger, will move the armature 116 to the left, closing the contacts 131 and 132, which, through the lead 134 energizes the coil 133, the current passing therefrom through the lead 105 back to the negative lead 81. The coil 119, now being dead, and the coil 133 being energized, which has heretofore been designated as the lower coil 41 in the welding head, sufficient electro-magnetic force will be produced to arrest the rotation of the gear 22. The gear 22 when arrested will cause a rotation of the gear 51, which will move the electrode 7 upwardly or further from the work to strike the welding arc.

When the arc is struck between the electrode 7 and the work 126, thereby permitting the current to flow in the welding circuit, the coil 135 will become energized, tripping the time delay switch 136. The time delay switch 136 will, after a predetermined length of time, cause an energization of the solenoid 137 by means of the current flowing from the lead 80, through the coil 137, the lead 139 and the switch 136, which is connected to the negative lead 88. The effect of the energization of the solenoid 137 is to make contact between the leads 140 and 141, and 142 and 143. By effecting contact between the leads 140 and 141 current is permitted to flow from the positive lead 80, through the lead 144, through the armature 145, the lead 146, and through the leads 140 and 141, to the negative lead 81. The field coil 147 is, by means of the leads 148 and 149, connected across the leads 80 and 81, through the rheostat 150. The effect of making contact between the leads 142 and 143 is to keep the coil 137 energized directly through the lead 151 which has the effect of cutting out the time delay switch 136 and still maintain energization of the coil 137.

A further description of my invention is deemed unnecessary to those acquainted with the art, suffice it to say that various detail changes might readily be adopted without departing from the principle of my invention and without materially changing the effectiveness of its operation.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In arc welding mechanism, the combination of a welding electrode, means for rotatably supporting such electrode and moving the same along the seam to be welded, electrically actuated means for moving said electrode axially until the electrode strikes the work and then automatically retracting the same to strike the welding arc, and means electrically interconnected with the means moving said electrode axially and along the seam for effecting said latter movement at a predetermined time after such welding arc is struck.

2. In arc welding mechanism, the combination of a welding electrode, electrically actuated means for moving said electrode relatively to the work, and means functionally responsive to the voltage of the welding circuit adapted to supply current in rapidly reoccuring successive independent impulses to said moving means.

3. In arc welding mechanism, the combination of a welding electrode, electrically actuated means adapted to move said electrode relatively to the work, and means functionally responsive to the voltage of the welding circuit for supplying current in opposite directions and in re-occurring impulses to said electrode moving means.

4. In arc welding mechanism, the combination of a welding electrode, electrically actuated means adapted to move said electrode relatively to the work, and means functionally responsive to the voltage of the welding circuit for supplying current in opposite directions, in accordance with the variations in the arc voltage on opposite sides from a predetermined value, and in rapidly re-occurring impulses to said electrode moving means.

5. In arc welding mechanism, the combination of an electrode, rotatable electrode supporting means, gears mounted to normally rotate with said supporting means, a rotatable pinion carried by said supporting means and in mesh with said gears, means responsive to rotation of said opinion adapted to move said electrode relatively to the work, and means for effecting relative rotation of said gears.

6. In arc welding mechanism, the combination of an electrode, rotatable electrode supporting means, gears mounted to normally rotate with said supporting means, a rotatable pinion carried by said supporting means and in mesh with said gears, means responsive to rotation of said pinion adapted to move said electrode relatively to the work, and means responsive to the voltage of the welding circuit for effecting relative rotation of said gears.

7. In arc welding mechanism, the combination of an electrode, rotatable electrode supporting means, gears mounted to normally rotate with said supporting means, a rotatable pinion carried by said supporting means and in mesh with said gears, means responsive to rotation of said pinion adapted to move said electrode relatively to the work, and means responsive to the voltage of the welding circuit for braking one of said gears.

8. In arc welding mechanism, the combination of an electrode, rotatable electrode supporting means, gears mounted to normally rotate with said supporting means, a rotatable pinion carried by said supporting means and in mesh with said gears, means responsive to rotation of said pinion adapted to move said electrode relatively to the work, and means responsive to variations in the voltage of the welding circuit for selectively braking said gears.

9. In arc welding mechanism, the combination of an electrode, rotatable electrode supporting means, gears mounted to normally rotate with said supporting means, a rotatable pinion carried by said supporting means and in mesh with said gears, means responsive to rotation of said pinion adapted to move said electrode relatively to the work, an electro-magnetic brake associated with one of said gears, and means functionally responsive to variations in the voltage of the welding circuit for energizing said brake.

10. In arc welding mechanism, the combination of an electrode, rotatable electrode supporting means, gears mounted to normally rotate with said supporting means, a rotatable pinion carried by said supporting means and in mesh with said gears, means responsive to rotation of said pinion adapted to move said electrode relatively to the work, an electro-magnetic brake associated with each of said first named gears, and means responsive to variations in the voltage of the welding circuit for selectively energizing said brakes.

11. In arc welding mechanism, the combination of an electrode, rotatable electrode supporting means, gears mounted to normally rotate with said supporting means, a pinion carried by said supporting means and in mesh with said gears, means responsive to rotation of said pinion adapted to move said electrode relatively to the work, and means for intermittently arresting the rotation of one of said gears.

12. In arc welding mechanism, the combination of an electrode, rotatable electrode supporting means, gears mounted to normally rotate with said supporting means, a pinion carried by said supporting means and in mesh with said gears, means responsive to rotation of said pinion adapted to move said electrode relatively to the work, and means functionally responsive to variations in the welding circuit voltage for intermittently arresting the rotation of one of said gears.

13. In arc welding apparatus, the combination of a welding electrode, means for supporting said electrode in arcing relation to the work, means for relatively moving the work and electrode to cause the latter to follow the line to be welded, and means effective, at the expiration of a predetermined time after the arc is struck, to energize said means for relatively moving the work and electrode.

14. In arc welding apparatus, the combination of a welding electrode, means for supporting said electrode in arcing relation to the work, means for relatively moving the work and electrode to cause the latter to follow the line to be welded, and means functionally responsive to the establishment of said arc and effective at the expiration of a predetermined time thereafter for energizing said means for relatively moving the work and electrode.

Signed by me, this 13th day of November, 1930.

SAMUEL C. OSBORNE.